United States Patent
Mukherjee et al.

(10) Patent No.: US 12,443,501 B2
(45) Date of Patent: Oct. 14, 2025

(54) SYSTEM AND METHOD FOR ANALYZING OPERATIONAL PARAMETERS OF ELECTRONIC AND SOFTWARE COMPONENTS ASSOCIATED WITH ENTITY APPLICATIONS TO DETECT ANOMALIES

(71) Applicant: BANK OF AMERICA CORPORATION, Charlotte, NC (US)

(72) Inventors: Maharaj Mukherjee, Poughkeepsie, NY (US); Carl M. Benda, Kannapolis, NC (US); Suman Roy Choudhury, Berkeley Heights, NJ (US); Colin Murphy, Charlotte, NC (US); Elvis Nyamwange, Little Elm, TX (US); Utkarsh Raj, Charlotte, NC (US); Vidya Srikanth, Sunnyvale, CA (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 145 days.

(21) Appl. No.: 18/523,317

(22) Filed: Nov. 29, 2023

(65) Prior Publication Data
US 2024/0176718 A1    May 30, 2024

Related U.S. Application Data

(60) Provisional application No. 63/428,995, filed on Nov. 30, 2022.

(51) Int. Cl.
*H04L 12/24* (2006.01)
*G06F 11/30* (2006.01)
(Continued)

(52) U.S. Cl.
CPC ........ *G06F 11/302* (2013.01); *G06F 11/3452* (2013.01)

(58) Field of Classification Search
CPC . G06F 11/302; G06F 11/3452; G06F 11/0751
(Continued)

(56) References Cited

U.S. PATENT DOCUMENTS

| 8,819,106 B1 | 8/2014 | Sirota |
| 9,442,810 B2 | 9/2016 | Jaisinghani |

(Continued)

FOREIGN PATENT DOCUMENTS

| AU | 2017208360 A1 | * | 4/2018 |
| JP | 2005208847 A | * | 8/2005 |

(Continued)

*Primary Examiner* — Ario Etienne
*Assistant Examiner* — Elizabeth Kassa
(74) *Attorney, Agent, or Firm* — Moore & Van Allen PLLC; Anoohya Yarlagadda (57) ABSTRACT

Embodiments of the present invention provide a system for analyzing operational parameters of electronic and software components associated with entity applications to detect anomalies. The system is configured for extracting one or more historical images associated with resiliency status of electronic and software components associated with an entity application, analyzing the one or more historical images to generate a pixel wise average of the one or more historical images, generating similarity scores between the one or more historical images, determining a distribution of the similarity scores, receiving a real-time image associated with a current resiliency status of the electronic and software components associated with the entity application, generating a real-time image similarity score for the real-time image, and comparing the real-time image similarity score with the distribution to detect presence of an anomaly.

17 Claims, 6 Drawing Sheets

(51) Int. Cl.
*G06F 11/34* (2006.01)
*H04L 41/0803* (2022.01)

(58) Field of Classification Search
USPC ............................................. 709/224
See application file for complete search history.

(56) References Cited

U.S. PATENT DOCUMENTS

| | | | |
|---|---|---|---|
| 10,129,100 B2 | 11/2018 | Hinrichs | |
| 10,205,643 B2 | 2/2019 | Fletcher | |
| 10,225,136 B2 | 3/2019 | Bingham | |
| 10,318,541 B2 | 6/2019 | Bingham | |
| 10,331,720 B2 | 6/2019 | Neels | |
| 10,346,357 B2 | 7/2019 | Bingham | |
| 10,353,957 B2 | 7/2019 | Bingham | |
| 10,379,895 B2 | 8/2019 | Bingham | |
| 10,515,469 B2 | 12/2019 | Fletcher | |
| 10,984,378 B1* | 4/2021 | Eckman | G06K 19/06131 |
| 11,676,367 B1* | 6/2023 | Owechko | G06T 7/136 |
| | | | 720/600 |
| 2009/0182866 A1 | 7/2009 | Watanabe | |
| 2013/0013248 A1* | 1/2013 | Brugler | G06F 11/3082 |
| | | | 702/130 |
| 2013/0124714 A1 | 5/2013 | Bednar | |
| 2014/0201642 A1 | 7/2014 | Vicat-Blanc | |
| 2018/0039717 A1* | 2/2018 | Bak | G06F 30/20 |
| 2019/0366189 A1* | 12/2019 | Plant | G06F 18/22 |
| 2021/0240996 A1* | 8/2021 | Sokhandan Asl | G06F 18/2431 |
| 2022/0141449 A1* | 5/2022 | Pieper | G05D 1/0061 |
| | | | 348/175 |
| 2022/0141450 A1* | 5/2022 | Pieper | G06T 7/0002 |
| | | | 348/148 |
| 2022/0172337 A1* | 6/2022 | Li | G06V 30/1444 |
| 2022/0335288 A1* | 10/2022 | Egorova | G06T 7/001 |
| 2022/0383615 A1* | 12/2022 | Saraee | G06V 10/40 |
| 2024/0010227 A1* | 1/2024 | Gyllenhammar | G06V 20/56 |
| 2025/0128726 A1* | 4/2025 | Kim | B60W 40/09 |

FOREIGN PATENT DOCUMENTS

| | | |
|---|---|---|
| JP | 2007011823 A | 1/2007 |
| KR | 102477088 B1 * | 12/2022 |
| WO | WO-2018181837 A1 * | 10/2018 |
| WO | WO-2022003011 A1 * | 1/2022 |
| WO | WO-2022132408 A1 * | 6/2022 |

* cited by examiner

SYSTEM AND METHOD FOR ANALYZING OPERATIONAL PARAMETERS OF ELECTRONIC AND SOFTWARE COMPONENTS ASSOCIATED WITH ENTITY APPLICATIONS TO DETECT ANOMALIES

CROSS-REFERENCE TO RELATED APPLICATIONS

This application claims the benefit of U.S. Provisional Patent Application Ser. No. 63/428,995, filed Nov. 30, 2022, entitled "System And Method For Analyzing Operational Parameters Of Electronic And Software Components Associated With Entity Applications To Detect Anomalies," the entirety of which is incorporated herein by reference.

BACKGROUND

There exists a need for a system that can analyze operational parameters of electronic and software components associated with entity applications to detect anomalies.

BRIEF SUMMARY

The following presents a summary of certain embodiments of the invention. This summary is not intended to identify key or critical elements of all embodiments nor delineate the scope of any or all embodiments. Its sole purpose is to present certain concepts and elements of one or more embodiments in a summary form as a prelude to the more detailed description that follows.

Embodiments of the present invention address the above needs and/or achieve other advantages by providing apparatuses (e.g., a system, computer program product and/or other devices) and methods for analyzing operational parameters of electronic and software components associated with entity applications to detect anomalies. The system embodiments may comprise one or more memory devices having computer readable program code stored thereon, a communication device, and one or more processing devices operatively coupled to the one or more memory devices, wherein the one or more processing devices are configured to execute the computer readable program code to carry out the invention. In computer program product embodiments of the invention, the computer program product comprises at least one non-transitory computer readable medium comprising computer readable instructions for carrying out the invention. Computer implemented method embodiments of the invention may comprise providing a computing system comprising a computer processing device and a non-transitory computer readable medium, where the computer readable medium comprises configured computer program instruction code, such that when said instruction code is operated by said computer processing device, said computer processing device performs certain operations to carry out the invention.

In some embodiments, the present invention extracts one or more historical images associated with resiliency status of electronic and software components associated with an entity application, analyzes the one or more historical images to generate a pixel wise average of the one or more historical images, generates similarity scores between the one or more historical images, determines a distribution of the similarity scores, receives a real-time image associated with a current resiliency status of the electronic and software components associated with the entity application, generates a real-time image similarity score for the real-time image, and compares the real-time image similarity score with the distribution to detect presence of an anomaly.

In some embodiments, the present invention determines that the real-time image similarity score is below a threshold associated with the distribution and determines the anomaly in the real-time image.

In some embodiments, the present invention performs one or more actions to mitigate the anomaly.

In some embodiments, the present invention generates and transmits one or more notifications associated with the anomaly to one or more users.

In some embodiments, the present invention determines that the real-time image similarity score is above a threshold associated with the distribution and determines that the anomaly does not exist in the real-time image.

In some embodiments, the present invention receives heat map data associated with the real-time image and determines the presence of the anomaly based on the heat map data.

In some embodiments, generating the real-time image similarity score for the real-time image comprises comparing the real-time image to the pixel-wise average to determine the presence of the anomaly.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Having thus described embodiments of the invention in general terms, reference will now be made the accompanying drawings, wherein:

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As described herein, the term "entity" may be any organization that utilizes one or more entity resources, including, but not limited to, one or more entity systems, one or more entity databases, one or more applications, one or more servers, or the like to perform one or more organization activities associated with the entity. In some embodiments, an entity may be any organization that develops, maintains, utilizes, and/or controls one or more applications. Applications as described herein may be any software applications configured to perform one or more operations of the entity. In some embodiments, the entity may be a financial institution which may include herein may include any financial institutions such as commercial banks, thrifts, federal and state savings banks, savings and loan associations, credit unions, investment companies, insurance companies and the like. In some embodiments, the financial institution may allow a customer to establish an account with the financial institution. In some embodiments, the entity may be a non-financial institution.

Many of the example embodiments and implementations described herein contemplate interactions engaged in by a user with a computing device and/or one or more communication devices and/or secondary communication devices. A "user", as referenced herein, may refer to an entity or individual that has the ability and/or authorization to access and use one or more applications, systems, servers, and/or devices provided by the entity and/or the system of the present invention. Furthermore, as used herein, the term "user computing device" or "mobile device" may refer to mobile phones, computing devices, tablet computers, wearable devices, smart devices and/or any portable electronic device capable of receiving and/or storing data therein.

A "user interface" is any device or software that allows a user to input information, such as commands or data, into a device, or that allows the device to output information to the user. For example, the user interface includes a graphical user interface (GUI) or an interface to input computer-executable instructions that direct a processing device to carry out specific functions. The user interface typically employs certain input and output devices to input data received from a user or to output data to a user. These input and output devices may include a display, mouse, keyboard, button, touchpad, touch screen, microphone, speaker, LED, light, joystick, switch, buzzer, bell, and/or other user input/output device for communicating with one or more users.

Typically, one or more entity applications associated with an entity are implemented via electronic components and software components. In some instances, the operating status of the electronic components and software components may decline, thereby resulting in failure and downtime of the one or more entity applications. As such, there exists a need for system to detect any anomalies in the operating status of the electronic components and software components that may result in failure of the one or more entity applications. The system of the present invention solves this problem as discussed in detail below.

Figure 1:
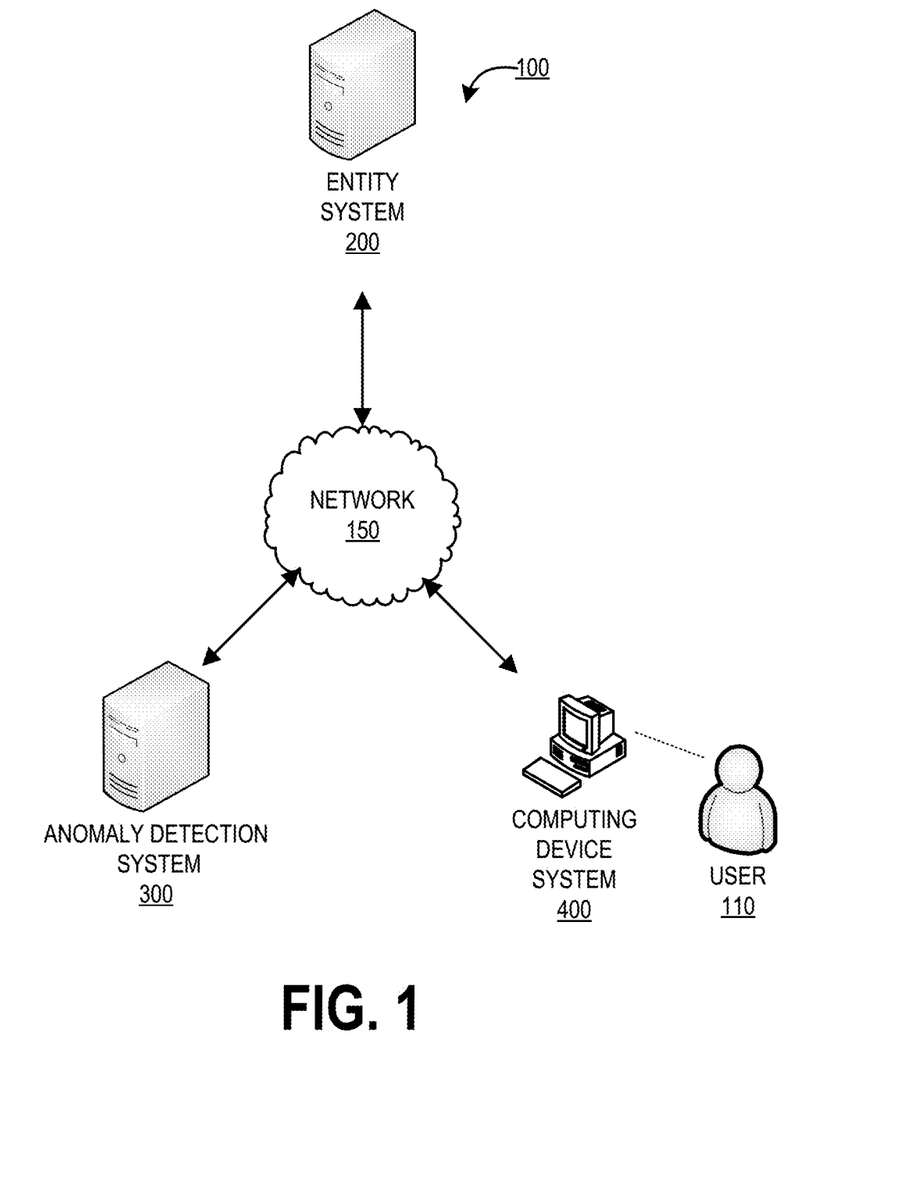
FIG. 1 provides a block diagram illustrating a system environment for analyzing operational parameters of electronic and software components associated with entity applications to detect anomalies, in accordance with an embodiment of the invention.

FIG. 1 provides a block diagram illustrating a system environment 100 for analyzing operational parameters of electronic and software components associated with entity applications to detect anomalies, in accordance with an embodiment of the invention. As illustrated in FIG. 1, the environment 100 includes an anomaly detection system 300, an entity system 200, and a computing device system 400. One or more users 110 may be included in the system environment 100, where the users 110 interact with the other entities of the system environment 100 via a user interface of the computing device system 400. In some embodiments, the one or more user(s) 110 of the system environment 100 may be employees (e.g., exposure analysts, application developers, application owners, application end users, business analysts, finance agents, or the like) of an entity associated with the entity system 200, where the employees access one or more entity resources (e.g., systems, servers, applications, databases, devices, and/or the like).

The entity system(s) 200 may be any system owned or otherwise controlled by an entity to support or perform one or more process steps described herein. In some embodiments, the entity is a financial institution. In some embodiments, the entity may be a non-financial institution. In some embodiments, the entity may be any organization that utilizes one or more entity resources to perform one or more organizational activities. In some embodiments, the entity systems 200 may further comprise one or more servers, one or more devices, and/or the like.

The anomaly detection system 300 is a system of the present invention for performing one or more process steps described herein. In some embodiments, the anomaly detection system 300 may be an independent system. In some embodiments, the anomaly detection system 300 may be a part of the entity system 200.

The anomaly detection system 300, the entity system 200, and the computing device system 400 may be in network communication across the system environment 100 through the network 150. The network 150 may include a local area network (LAN), a wide area network (WAN), and/or a global area network (GAN). The network 150 may provide for wireline, wireless, or a combination of wireline and wireless communication between devices in the network. In one embodiment, the network 150 includes the Internet. In general, the anomaly detection system 300 is configured to communicate information or instructions with the entity system 200, and/or the computing device system 400 across the network 150.

The computing device system 400 may be a system owned or controlled by the entity of the entity system 200 and/or the user 110. As such, the computing device system 400 may be a computing device of the user 110. In general, the computing device system 400 communicates with the user 110 via a user interface of the computing device system 400, and in turn is configured to communicate information or instructions with the anomaly detection system 300, and/or entity system 200 across the network 150. In some embodiments, the computing device system 400 may be any device of an employee of the entity.

Figure 2:
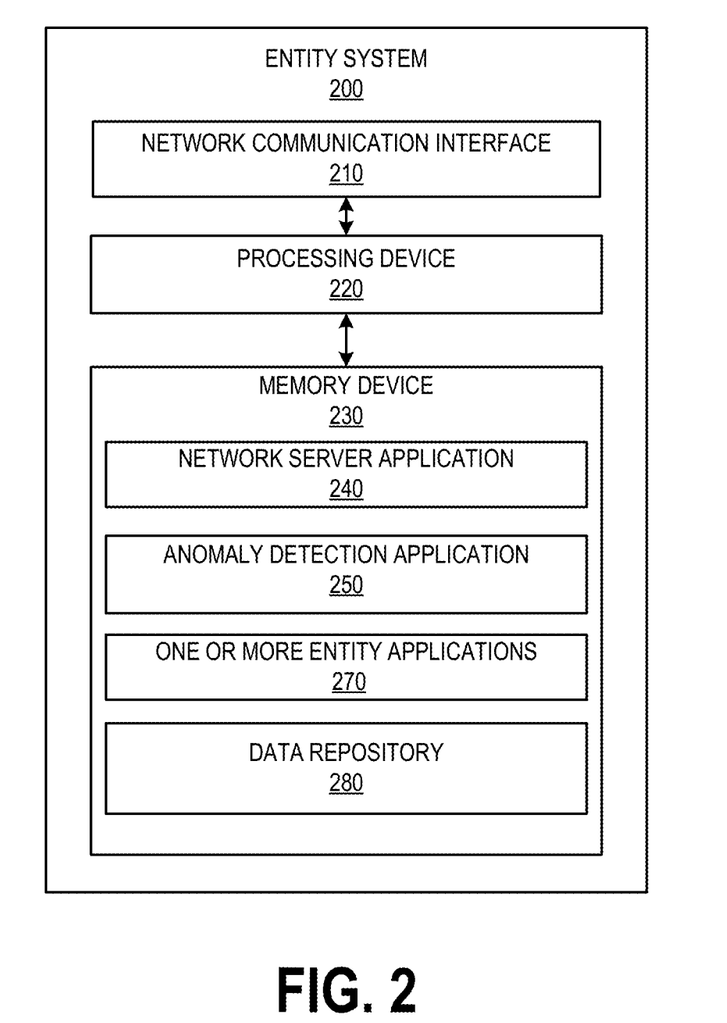
FIG. 2 provides a block diagram illustrating the entity system 200 of FIG. 1, in accordance with an embodiment of the invention.

FIG. 2 provides a block diagram illustrating the entity system 200, in greater detail, in accordance with embodiments of the invention. As illustrated in FIG. 2, in one embodiment of the invention, the entity system 200 includes one or more processing devices 220 operatively coupled to a network communication interface 210 and a memory device 230. In certain embodiments, the entity system 200 is operated by an entity, such as a financial institution. In some embodiments, the entity system 200 is operated by an entity, such as a non-financial institution.

It should be understood that the memory device 230 may include one or more databases or other data structures/repositories. The memory device 230 also includes computer-executable program code that instructs the processing device 220 to operate the network communication interface 210 to perform certain communication functions of the entity system 200 described herein. For example, in one embodiment of the entity system 200, the memory device 230 includes, but is not limited to, an anomaly detection application 250, one or more entity applications 270, and a data repository 280 comprising information associated with entity resource data 283. The one or more entity applications 270 may be any applications developed, supported, maintained, utilized, and/or controlled by the entity. Entity resource data 283 may comprise any data associated with the one or more entity resources of the entity. The computer-executable program code of the network server application 240, the anomaly detection application 250, the one or more entity application 270 to perform certain logic, data-extraction, and data-storing functions of the entity system 200 described herein, as well as communication functions of the entity system 200.

The network server application 240, the anomaly detection application 250, and the one or more entity applications 270 are configured to store data in the data repository 280 or to use the data stored in the data repository 280 when communicating through the network communication interface 210 with the anomaly detection system 300, and/or the computing device system 400 to perform one or more process steps described herein. In some embodiments, the entity system 200 may receive instructions from the anomaly detection system 300 via the anomaly detection application 250 to perform certain operations. The anomaly detection application 250 may be provided by the anomaly detection system 300. The one or more entity applications 270 may be any of the applications used, created, modified, facilitated, and/or managed by the entity system 200.

Figure 3:
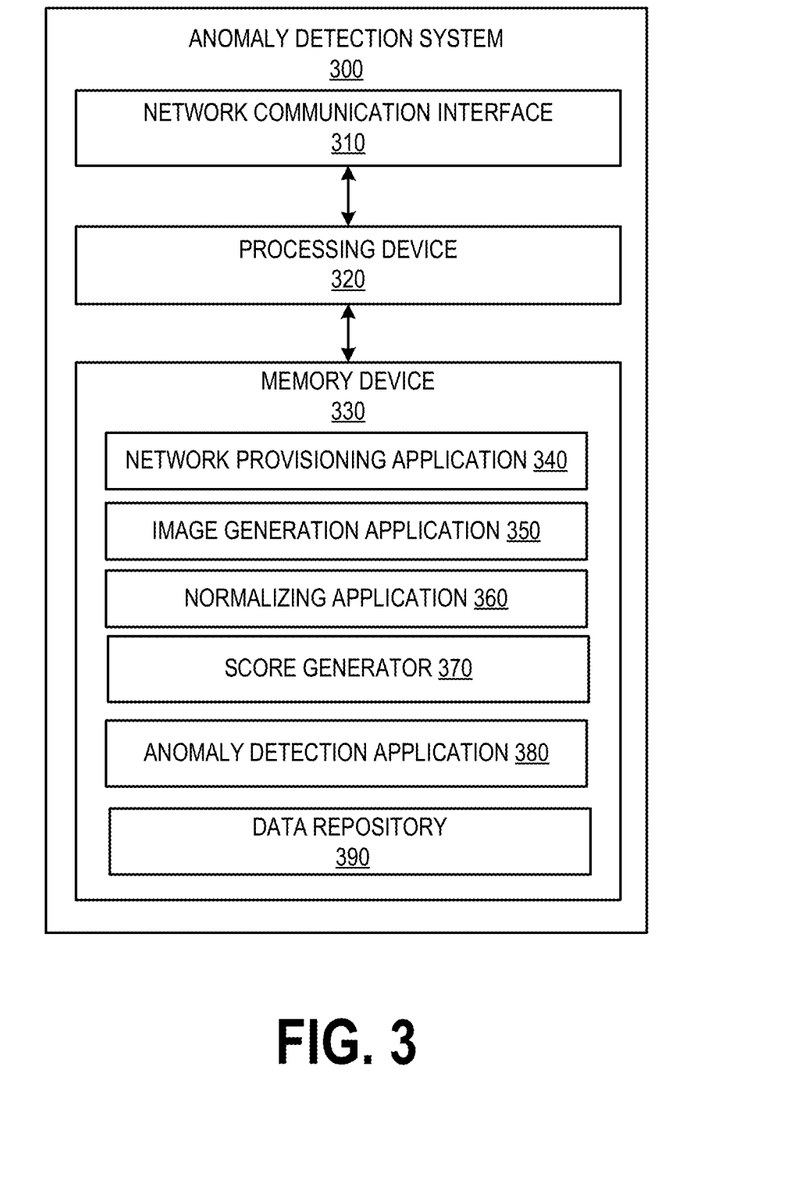
FIG. 3 provides a block diagram illustrating an anomaly detection system 300 of FIG. 1, in accordance with an embodiment of the invention.

FIG. 3 provides a block diagram illustrating the anomaly detection system 300 in greater detail, in accordance with embodiments of the invention. As illustrated in FIG. 3, in one embodiment of the invention, the anomaly detection system 300 includes one or more processing devices 320 operatively coupled to a network communication interface 310 and a memory device 330. In certain embodiments, the anomaly detection system 300 is operated by an entity, such as a financial institution. In some embodiments, the anomaly detection system 300 is owned or operated by the entity of the entity system 200. In some embodiments, the anomaly detection system 300 may be an independent system. In alternate embodiments, the anomaly detection system 300 may be a part of the entity system 200.

It should be understood that the memory device 330 may include one or more databases or other data structures/repositories. The memory device 330 also includes computer-executable program code that instructs the processing device 320 to operate the network communication interface 310 to perform certain communication functions of the anomaly detection system 300 described herein. For example, in one embodiment of the anomaly detection system 300, the memory device 330 includes, but is not limited to, a network provisioning application 340, an image generation application 350, a normalizing application 360, a score generator 370, an anomaly detection application 380, and a data repository 390 comprising any data processed or accessed by one or more applications in the memory device 330. The computer-executable program code of the network provisioning application 340, the image generation application 350, the normalizing application 360, the score generator 370, and the anomaly detection application 380 may instruct the processing device 320 to perform certain logic, data-processing, and data-storing functions of the anomaly detection system 300 described herein, as well as communication functions of the anomaly detection system 300.

The network provisioning application 340, the image generation application 350, the normalizing application 360, the score generator 370, and the anomaly detection application 380 are configured to invoke or use the data in the data repository 390 when communicating through the network communication interface 310 with the entity system 200, and/or the computing device system 400. In some embodiments, the network provisioning application 340, the image generation application 350, the normalizing application 360, the score generator 370, and the anomaly detection application 380 may store the data extracted or received from the entity system 200, and the computing device system 400 in the data repository 390. In some embodiments, the network provisioning application 340, the image generation application 350, the normalizing application 360, the score generator 370, and the anomaly detection application 380 may be a part of a single application. The functionalities of the network provisioning application 340, the image generation application 350, the normalizing application 360, the score generator 370, and the anomaly detection application 380 are explained in greater detail in FIG. 5.

Figure 4:
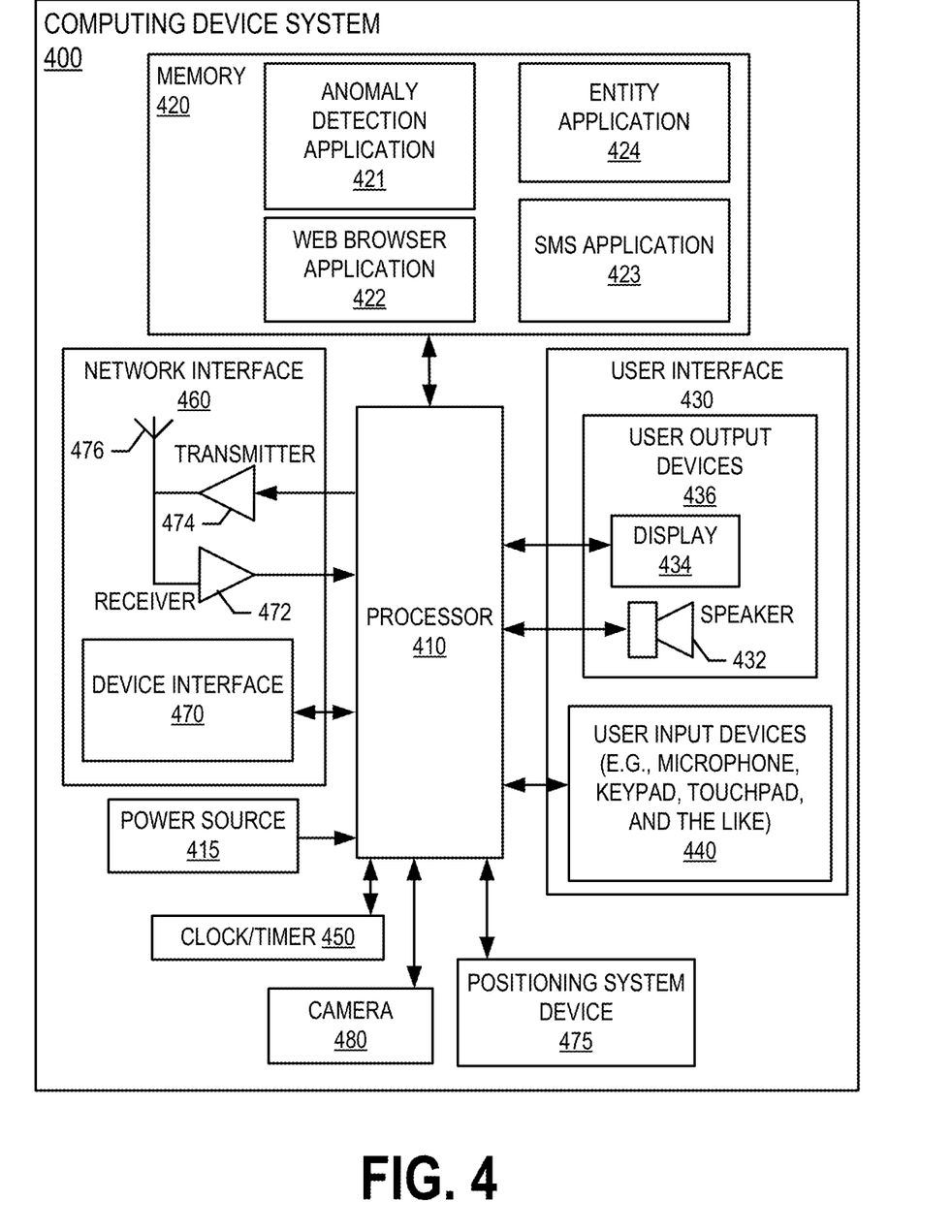
FIG. 4 provides a block diagram illustrating the computing device system 400 of FIG. 1, in accordance with an embodiment of the invention.

FIG. 4 provides a block diagram illustrating a computing device system 400 of FIG. 1 in more detail, in accordance with embodiments of the invention. However, it should be understood that a mobile telephone is merely illustrative of one type of computing device system 400 that may benefit from, employ, or otherwise be involved with embodiments of the present invention and, therefore, should not be taken to limit the scope of embodiments of the present invention. Other types of computing devices may include portable digital assistants (PDAs), pagers, mobile televisions, entertainment devices, desktop computers, workstations, laptop computers, cameras, video recorders, audio/video player, radio, GPS devices, wearable devices, Internet-of-things devices, augmented reality devices, virtual reality devices, automated teller machine devices, electronic kiosk devices, or any combination of the aforementioned.

Some embodiments of the computing device system 400 include a processor 410 communicably coupled to such devices as a memory 420, user output devices 436, user input devices 440, a network interface 460, a power source 415, a clock or other timer 450, a camera 480, and a positioning system device 475. The processor 410, and other processors described herein, generally include circuitry for implementing communication and/or logic functions of the computing device system 400. For example, the processor 410 may include a digital signal processor device, a microprocessor device, and various analog to digital converters, digital to analog converters, and/or other support circuits. Control and signal processing functions of the computing device system 400 are allocated between these devices according to their respective capabilities. The processor 410 thus may also include the functionality to encode and interleave messages and data prior to modulation and transmission. The processor 410 can additionally include an internal data modem. Further, the processor 410 may include functionality to operate one or more software programs, which may be stored in the memory 420. For example, the processor 410 may be capable of operating a connectivity program, such as a web browser application 422. The web browser application 422 may then allow the computing device system 400 to transmit and receive web content, such as, for example, location-based content and/or other web page content, according to a Wireless Application Protocol (WAP), Hypertext Transfer Protocol (HTTP), and/or the like.

The processor 410 is configured to use the network interface 460 to communicate with one or more other devices on the network 150. In this regard, the network interface 460 includes an antenna 476 operatively coupled to a transmitter 474 and a receiver 472 (together a "transceiver"). The processor 410 is configured to provide signals to and receive signals from the transmitter 474 and receiver 472, respectively. The signals may include signaling information in accordance with the air interface standard of the applicable cellular system of the network 150 (e.g., wireless network). In this regard, the computing device system 400 may be configured to operate with one or more air interface standards, communication protocols, modulation types, and access types. By way of illustration, the computing device system 400 may be configured to operate in accordance with any of a number of first, second, third, and/or fourth-generation communication protocols and/or the like.

As described above, the computing device system 400 has a user interface that is, like other user interfaces described herein, made up of user output devices 436 and/or user input devices 440. The user output devices 436 include a display 430 (e.g., a liquid crystal display or the like) and a speaker 432 or other audio device, which are operatively coupled to the processor 410.

The user input devices 440, which allow the computing device system 400 to receive data from a user such as the user 110, may include any of a number of devices allowing the computing device system 400 to receive data from the user 110, such as a keypad, keyboard, touch-screen, touchpad, microphone, mouse, joystick, other pointer device, button, soft key, and/or other input device(s). The user interface may also include a camera 480, such as a digital camera.

The computing device system 400 may also include a positioning system device 475 that is configured to be used by a positioning system to determine a location of the computing device system 400. For example, the positioning system device 475 may include a GPS transceiver. In some embodiments, the positioning system device 475 is at least partially made up of the antenna 476, transmitter 474, and receiver 472 described above. For example, in one embodiment, triangulation of cellular signals may be used to identify the approximate or exact geographical location of the computing device system 400. In other embodiments, the positioning system device 475 includes a proximity sensor or transmitter, such as an RFID tag, that can sense or be sensed by devices known to be located proximate a merchant or other location to determine that the computing device system 400 is located proximate these known devices.

The computing device system 400 further includes a power source 415, such as a battery, for powering various circuits and other devices that are used to operate the computing device system 400. Embodiments of the computing device system 400 may also include a clock or other timer 450 configured to determine and, in some cases, communicate actual or relative time to the processor 410 or one or more other devices.

The computing device system 400 also includes a memory 420 operatively coupled to the processor 410. As used herein, memory includes any computer readable medium (as defined herein below) configured to store data, code, or other information. The memory 420 may include volatile memory, such as volatile Random Access Memory (RAM) including a cache area for the temporary storage of data. The memory 420 may also include non-volatile memory, which can be embedded and/or may be removable. The non-volatile memory can additionally or alternatively include an electrically erasable programmable read-only memory (EEPROM), flash memory or the like.

The memory 420 can store any of a number of applications which comprise computer-executable instructions/code executed by the processor 410 to implement the functions of the computing device system 400 and/or one or more of the process/method steps described herein. For example, the memory 420 may include such applications as a conventional web browser application 422, an anomaly detection application 421, entity application 424. These applications also typically instructions to a graphical user interface (GUI) on the display 430 that allows the user 110 to interact with the entity system 200, the anomaly detection system 300, and/or other devices or systems. The memory 420 of the computing device system 400 may comprise a Short Message Service (SMS) application 423 configured to send, receive, and store data, information, communications, alerts, and the like via the network 150 (e.g., wireless telephone network). In some embodiments, the anomaly detection application 421 provided by the anomaly detection system 300 allows the user 110 to access the anomaly detection system 300. In some embodiments, the entity application 424 provided by the entity system 200 and the anomaly detection application 421 allow the user 110 to access the functionalities provided by the anomaly detection system 300 and the entity system 200.

The memory 420 can also store any of a number of pieces of information, and data, used by the computing device system 400 and the applications and devices that make up the computing device system 400 or are in communication with the computing device system 400 to implement the functions of the computing device system 400 and/or the other systems described herein.

Figure 5:
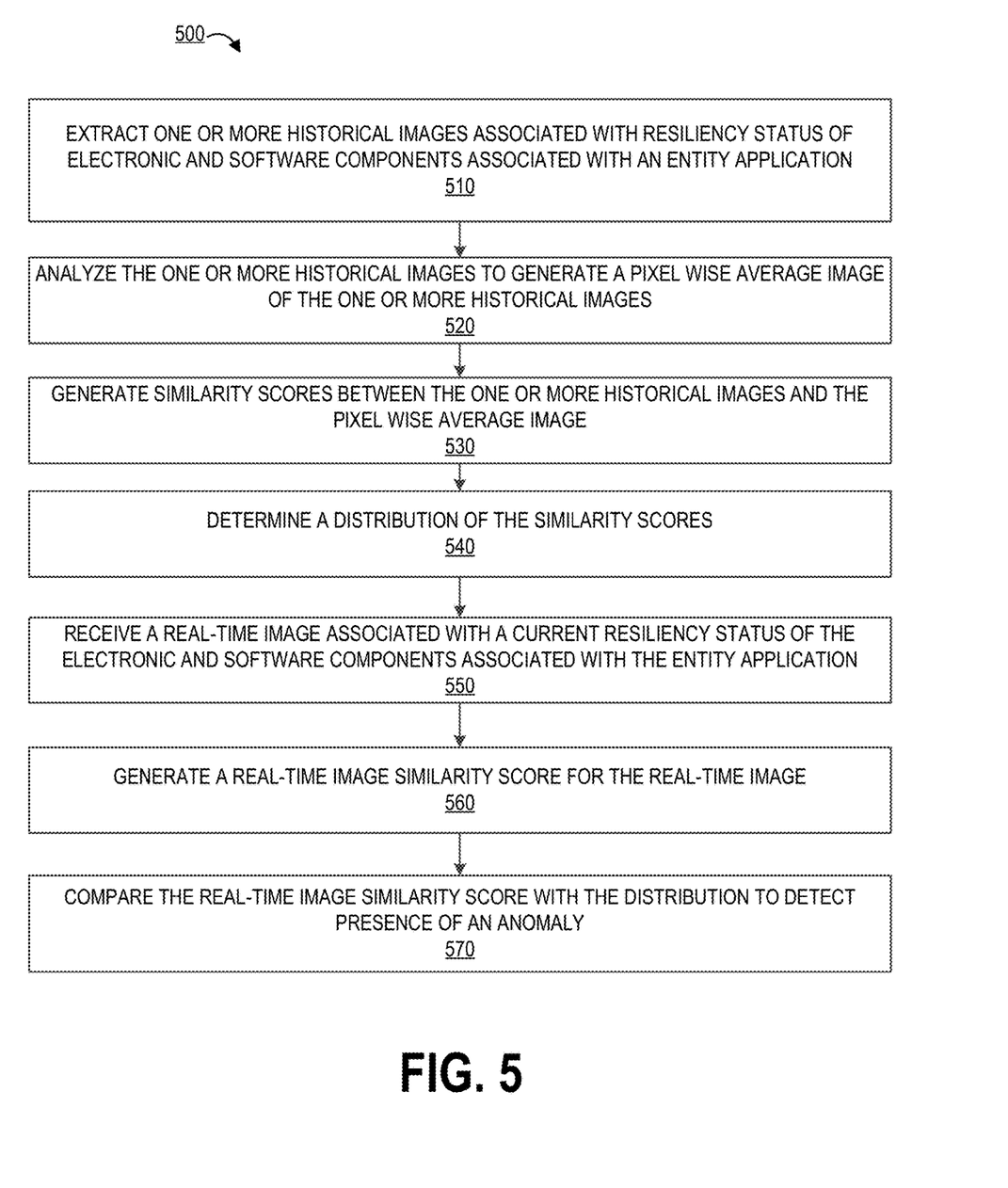
FIG. 5 provides a flowchart illustrating a process flow for analyzing operational parameters of electronic and software components associated with entity applications to detect anomalies, in accordance with an embodiment of the invention.

FIG. 5 provides a flowchart illustrating a process flow for analyzing operational parameters of electronic and software components associated with entity applications to detect anomalies, in accordance with an embodiment of the invention.

As shown in block 510, the system extracts one or more historical images associated with resiliency status of electronic and software components associated with an entity application. The one or more historical images associated with electronic and software components, wherein the one or more historical images are associated with the resiliency status of the device associated with electronic and software components. As described herein, the resiliency status of the device may refer to an operational status of the electronic and software components indicating their ability to perform allocated operational functions at a particular time instant. In some embodiments, data visualization techniques may be used to pictographically represent the resiliency status. To this end, the system may capture snapshots of images representing the performance telemetry of the electronic and software components. In some embodiments, the images may be captured at periodic time intervals. In doing so, the system may be able to visually represent any progressive changes in the performance telemetry of the electronic and software components that may inform the resiliency status, or any change thereof.

In one example, each performance parameter used to determine the resiliency status of the electronic and software components may compared to a performance threshold and subsequently be represented as a heat map in warm-to-cool colors depending on how the performance parameter falls relative to the performance threshold. Each performance parameter may have a performance threshold that is predetermined. In particular embodiments, if the value of the performance parameters keeps increasing relative to the performance threshold, the resulting heat map may show the performance parameter in warm colors. On the other hand, if the value of the performance parameters keeps decreases relative to the performance threshold, the resulting heat map may show the performance parameter in cool colors. Accordingly, the one or more historical images, in some embodiments, may be a collective heat map representation of the performance parameters of the electronic and software components.

As shown in block 520, the system analyzes the one or more historical images to generate a pixel wise average image of the one or more historical images. The system analyzes each of the one or more historical images to generate pixel-wise average image that comprises a set of pixels, where each pixel of the set of pixels is an average of pixels at the same location of the one or more historical images. For example, if all of the historical images are rectangular in shape and are divided into grids of pixels, the pixel-wise average image generated by the system comprising a first pixel at row '1' and column '1' is an average of pixels at row '1' and column '1' of all of the historical images.

As shown in block 530, the system generates similarity scores between the one or more historical images and the pixel-wise average image. The similarity scores generated by the system provide information about how similar each of the one or more historical images are to the pixel-wise average image generated by the system in block 520. As shown in block 540, the system determines a distribution of the similarity scores. The distribution curve of the similarity scores provides a threshold for detecting anomalies. In some embodiments, the distribution curve may be a bell curve.

As shown in block 550, the system receives a real-time image associated with a current resiliency status of the electronic and software components associated with the entity application. The real-time image comprises one or more pixels and has similar characteristics as that of the one or more historical images.

As shown in block 560, the system generates a real-time image similarity score for the real-time image. In response to receiving the real-time image, the similarity score for the real-time image is generated by comparing the real-time image with the pixel-wise average image. In some embodiments, comparison between the real-time image with the pixel-wise average image may be pixel-pixel comparison.

As shown in block 570, the system compares the real-time image similarity score with the distribution to detect presence of an anomaly. The system then measures the real-time image similarity score against the threshold calculated in block 540. In one embodiment, where the real-time image similarity score falls below the threshold, the real-time image is flagged as anomalous. In such embodiments, the system may perform one or more mitigation actions to mitigate the effects of the detected anomaly. In some embodiments, the one or more mitigation action may comprise transmitting one or more notifications to one or more users associated with the one or more entity applications. Other mitigation actions may comprise identifying one or more software components that are causing the abnormal operating conditions and may decommission at least one component of the one or software components that do not disable the core functions of the one or more entity applications. In another embodiment, where the real-time image similarity score falls above the threshold, the real-time image is considered normal, where the electronic and software components are operating under normal conditions. In some embodiments, the real-time image may comprise heat map data and the system may detect anomaly using the heat map data present in the real-time image.

Figure 6:
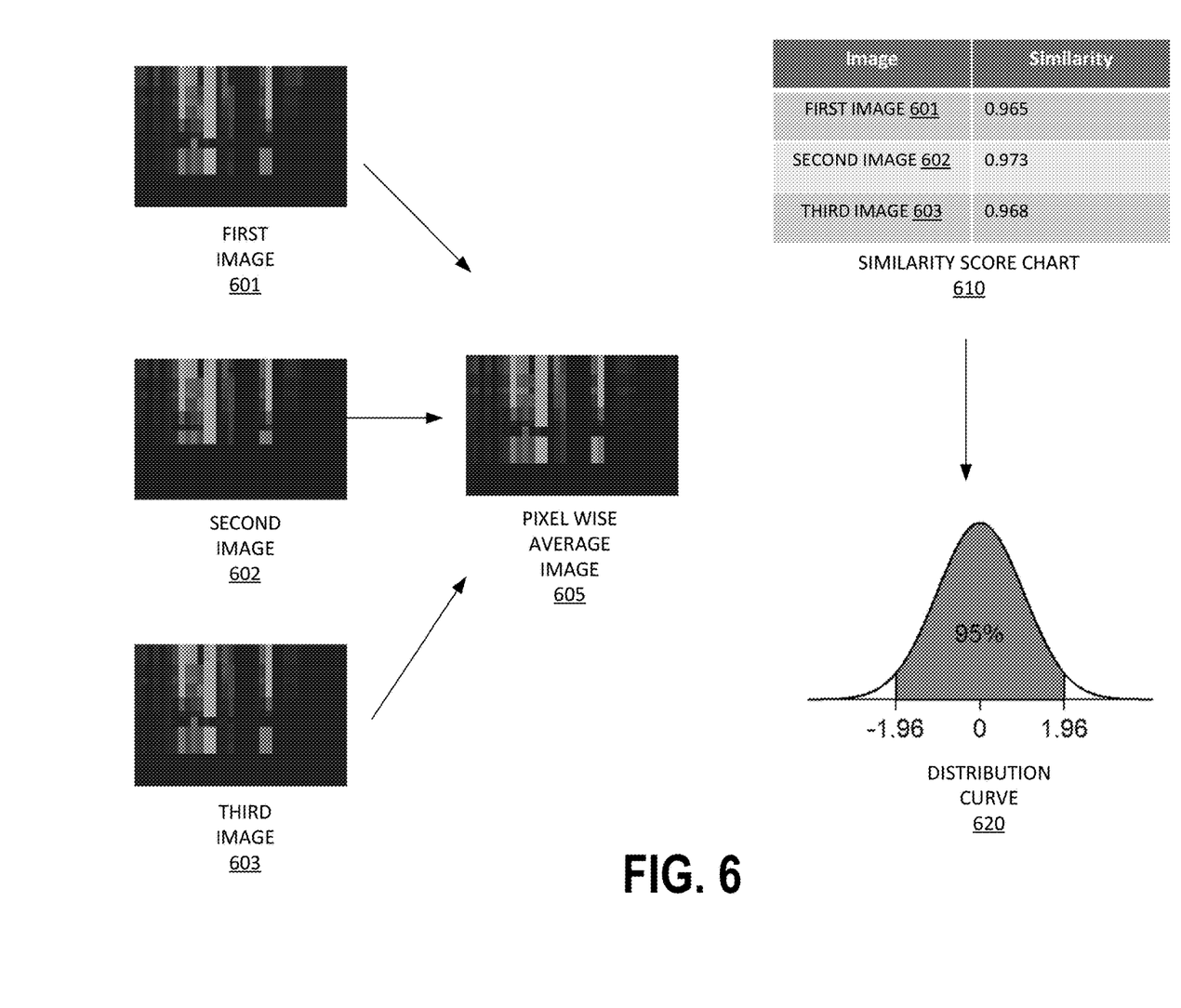
FIG. 6 provides a pictographic representation of analyzing operational parameters of electronic and software components associated with entity applications to detect anomalies, in accordance with an embodiment of the invention.

FIG. 6 provides a pictographic representation of analyzing operational parameters of electronic and software components associated with entity applications to detect anomalies, in accordance with an embodiment of the invention. As shown, the system extract one or more historical images associated with operating status of the one or more electronic and software components associated with the one or more entity applications, where the one or more historical images may comprise a first image 601, a second image 602, and third image 603. It should be understood that the system may extract 'n' number of historical images associated with the operating status of the one or more electronic and software components and the number of images shown in FIG. 6 are for explanatory purposes only. The system analyzes the first image 601, the second image 602, and the third image 603 to generate a pixel wise average image 605 as explained in block 520 of FIG. 5. The system then compares the first image 601, the second image 602, and the third image 603 with the pixel wise average image 605 to generate a similarity score chart 610 comprising similarity scores for the first image 601, the second image 602, and the third image 603. The system then generates a distribution curve 620 with the similarity scores for the first image 601, the second image 602, and the third image 603 from the similarity score chart 610, where the distribution curve 620 provides a threshold for detecting anomalies. The system continuously receives real-time images associated with the operating status of the electronic and software components associated with the one or more entity applications, where a similarity score is generated for the real-time images and is compared with the threshold provided by the distribution curve 620.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, and the like), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A system for analyzing operational parameters of electronic and software components associated with entity applications to detect anomalies, the system comprising:
 at least one network communication interface;
 at least one non-transitory storage device; and
 at least one processing device coupled to the at least one non-transitory storage device and the at least one network communication interface, wherein the at least one processing device is configured to:
  extract a plurality of historical images associated with resiliency status of electronic and software components associated with an entity application, wherein the plurality of historical images comprise historical heat map data associated with the resiliency status of the electronic and software components;
  analyze the plurality of historical images to generate a pixel wise average image representing the historical heat map data in the plurality of historical images;
  generate similarity scores between the plurality of historical images and the pixel wise average image;
  determine a distribution of the similarity scores;
  receive a real-time image associated with a current resiliency status of the electronic and software components associated with the entity application, wherein the real-time image comprises real-time heat map data associated with the current resiliency status of the electronic and software components;

determine presence of an anomaly based on the real-time heat map data in the real-time image, wherein determining the anomaly comprises:

generating a real-time image similarity score for the real-time image comprising the real-time heat map data; and comparing the real-time image similarity score with the distribution to detect presence of the anomaly.

2. The system of claim 1, wherein the at least one processing device is configured to:

determine that the real-time image similarity score is below a threshold associated with the distribution; and determine the anomaly in the real-time image.

3. The system of claim 2, wherein the at least one processing device is configured to perform one or more actions to mitigate the anomaly.

4. The system of claim 2, wherein the at least one processing device is configured to generate and transmit one or more notifications associated with the anomaly to one or more users.

5. The system of claim 1, wherein the at least one processing device is configured to:

determine that the real-time image similarity score is above a threshold associated with the distribution; and determine that the anomaly does not exist in the real-time image.

6. The system of claim 1, wherein generating the real-time image similarity score for the real-time image comprises comparing the real-time image to the pixel-wise average image to determine the presence of the anomaly.

7. A computer program product for analyzing operational parameters of electronic and software components associated with entity applications to detect anomalies, the computer program product comprising a non-transitory computer-readable storage medium having computer executable instructions for causing a computer processor to perform the steps of:

extracting a plurality of historical images associated with resiliency status of electronic and software components associated with an entity application, wherein the plurality of historical images comprise historical heat map data associated with the resiliency status of the electronic and software components;

analyzing the plurality of historical images to generate a pixel wise average representing the historical heat map data in the plurality of historical images;

generating similarity scores between the plurality of historical images;

determining a distribution of the similarity scores;

receiving a real-time image associated with a current resiliency status of the electronic and software components associated with the entity application, wherein the real-time image comprises real-time heat map data associated with the current resiliency status of the electronic and software components;

determining presence of an anomaly based on the real-time heat map data in the real-time image, wherein determining the anomaly comprises:

generating a real-time image similarity score for the real-time image comprising the real-time heat map data; and comparing the real-time image similarity score with the distribution to detect presence of the anomaly.

8. The computer program product of claim 7, wherein the computer executable instructions cause the computer processor to perform the steps of:

determining that the real-time image similarity score is below a threshold associated with the distribution; and determining the anomaly in the real-time image.

9. The computer program product of claim 8, wherein the computer executable instructions cause the computer processor to perform the step of performing one or more actions to mitigate the anomaly.

10. The computer program product of claim 8, wherein the computer executable instructions cause the computer processor to perform the step of generating and transmitting one or more notifications associated with the anomaly to one or more users.

11. The computer program product of claim 7, wherein the computer executable instructions cause the computer processor to perform the steps of:

determining that the real-time image similarity score is above a threshold associated with the distribution; and determining that the anomaly does not exist in the real-time image.

12. The computer program product of claim 7, wherein generating the real-time image similarity score for the real-time image comprises comparing the real-time image to the pixel-wise average to determine the presence of the anomaly.

13. A computer implemented method for analyzing operational parameters of electronic and software components associated with entity applications to detect anomalies, wherein the method comprises:

extracting a plurality of historical images associated with resiliency status of electronic and software components associated with an entity application, wherein the plurality of historical images comprise historical heat map data associated with the resiliency status of the electronic and software components;

analyzing the plurality of historical images to generate a pixel wise average representing the historical heat map data in the plurality of historical images;

generating similarity scores between the plurality of historical images;

determining a distribution of the similarity scores;

receiving a real-time image associated with a current resiliency status of the electronic and software components associated with the entity application, wherein the real-time image comprises real-time heat map data associated with the current resiliency status of the electronic and software components;

determining presence of an anomaly based on the real-time heat map data in the real-time image, wherein determining the anomaly comprises:

generating a real-time image similarity score for the real-time image comprising the real-time heat map data; and comparing the real-time image similarity score with the distribution to detect presence of the anomaly.

14. The computer implemented method of claim 13, wherein the method comprises:

determining that the real-time image similarity score is below a threshold associated with the distribution; and determining the anomaly in the real-time image.

15. The computer implemented method of claim 14, wherein the method comprises performing one or more actions to mitigate the anomaly.

16. The computer implemented method of claim 13, wherein the method comprises:

determining that the real-time image similarity score is above a threshold associated with the distribution; and determining that the anomaly does not exist in the real-time image.

17. The computer implemented method of claim 13, wherein t generating the real-time image similarity score for the real-time image comprises comparing the real-time image to the pixel-wise average to determine the presence of the anomaly.

\* \* \* \* \*